US008402166B2

(12) United States Patent
Carlson et al.

(10) Patent No.: US 8,402,166 B2
(45) Date of Patent: Mar. 19, 2013

(54) ACCESS CONTROL LIST ENDPOINT IMPLEMENTATION

(75) Inventors: Scott M. Carlson, Tuscon, AZ (US); Daniel G. Eisenhauer, Austin, TX (US); Roger G. Hathorn, Tuscon, AZ (US); Sandy K. Kao, Austin, TX (US); Jeffrey W. Palm, Rochester, MN (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 12/113,658

(22) Filed: May 1, 2008

(65) Prior Publication Data

US 2009/0276526 A1 Nov. 5, 2009

(51) Int. Cl.
*G06F 15/173* (2006.01)
*G06F 15/177* (2006.01)
*G06F 15/16* (2006.01)

(52) U.S. Cl. ......... 709/245; 709/228; 370/235; 370/401
(58) Field of Classification Search .................. 709/245, 709/217–224, 203, 228; 370/235, 401; 726/1
See application file for complete search history.

(56) References Cited

U.S. PATENT DOCUMENTS

| | | | | |
|---|---|---|---|---|
| 6,792,424 B1* | 9/2004 | Burns et al. | ........................ | 707/7 |
| 7,543,081 B2* | 6/2009 | Dugan et al. | ...................... | 710/3 |
| 7,577,729 B1* | 8/2009 | Umbehocker et al. | ........ | 709/223 |
| 7,991,860 B2* | 8/2011 | Otani | ............................ | 709/221 |
| 8,180,901 B2* | 5/2012 | Bagepalli et al. | ............. | 709/227 |
| 2004/0068668 A1* | 4/2004 | Lor et al. | ........................ | 713/201 |
| 2006/0149845 A1* | 7/2006 | Malin et al. | ..................... | 709/228 |
| 2006/0251067 A1* | 11/2006 | DeSanti et al. | ............... | 370/389 |
| 2006/0285493 A1* | 12/2006 | Manuja et al. | ................. | 370/235 |
| 2007/0153813 A1* | 7/2007 | Terpstra et al. | ............... | 370/401 |
| 2007/0168466 A1* | 7/2007 | Tooley et al. | .................. | 709/218 |
| 2008/0056300 A1* | 3/2008 | Williams | ....................... | 370/466 |
| 2008/0228942 A1* | 9/2008 | Lor et al. | ....................... | 709/238 |
| 2009/0037977 A1* | 2/2009 | Gai et al. | ........................... | 726/1 |
| 2009/0052326 A1* | 2/2009 | Bergamasco et al. | ......... | 370/236 |
| 2009/0052461 A1* | 2/2009 | Brown et al. | .................. | 370/401 |
| 2009/0063701 A1* | 3/2009 | Bagepalli et al. | ............. | 709/238 |
| 2009/0161692 A1* | 6/2009 | Hirata et al. | ................... | 370/466 |
| 2009/0164630 A1* | 6/2009 | Hirata et al. | ................... | 709/225 |
| 2009/0252181 A1* | 10/2009 | Desanti | .......................... | 370/474 |
| 2009/0254640 A1* | 10/2009 | Otani | ............................. | 709/221 |

* cited by examiner

*Primary Examiner* — Haresh N Patel
(74) *Attorney, Agent, or Firm* — Yudell Isidore Ng Russell PLLC

(57) ABSTRACT

A method, system, and computer program product for providing direct communications between FCoE endpoint devices within the same fibre channel network zone. A direct fibre channel (DFC) utility provides an FCoE stack with an exclusive ability to define an Ethertype within an ethertype field of an Ethernet packet with "FCoE". In addition, the DFC utility enables storage of access control lists (ACLs) containing allowed destination addresses and allowed source addresses within the adapter of an FCoE endpoint. Additionally, the DFC utility initiates an exchange of messages with an Ethernet switch to determine a feasibility of establishing direct connections between endpoints. In particular, the DFC utility determines whether the Ethernet switch supports FCoE ACL checking. Further, the DFC utility creates a zone ID for the FCoE endpoint device. The DFC utility allows direct communication between FCoE endpoints within the same fibre zone.

16 Claims, 6 Drawing Sheets

ACCESS CONTROL LIST ENDPOINT IMPLEMENTATION

BACKGROUND

1. Technical Field

The present invention generally relates to data processing systems and in particular to establishing connections in data processing (network) systems.

2. Description of the Related Art

In a fibre channel over Ethernet (FCoE) communication system, two endpoint devices communicate with each other through a FCoE switch. This type of indirect communication causes increased latency, introduces more traffic into the network, and creates complications which may impact the reliability of the network.

SUMMARY OF ILLUSTRATIVE EMBODIMENTS

Disclosed are a method, system, and computer program product for providing direct communications between FCoE endpoint devices within the same fibre channel network zone. A direct fibre channel (DFC) utility provides an FCoE stack with an exclusive ability to define an Ethertype within an ethertype field of an Ethernet packet with "FCoE". In addition, the DFC utility enables storage of access control lists (ACLs) containing allowed destination addresses and allowed source addresses within the adapter of an FCoE endpoint. Additionally, the DFC utility initiates an exchange of messages with an Ethernet switch to determine a feasibility of establishing direct connections between endpoints. In particular, the DFC utility determines whether the Ethernet switch supports FCoE ACL checking. Further, the DFC utility creates a zone ID for the FCoE endpoint device. The DFC utility allows direct communication between FCoE endpoints within the same fibre zone.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system, and computer program product for providing direct communications between FCoE endpoint devices within the same fibre channel network zone. A direct fibre channel (DFC) utility provides an FCoE stack with an exclusive ability to define an Ethertype within an ethertype field of an Ethernet packet with "FCoE". In addition, the DFC utility enables storage of access control lists (ACLs) containing allowed destination addresses and allowed source addresses within the adapter of an FCoE endpoint. Additionally, the DFC utility initiates an exchange of messages with an Ethernet switch to determine a feasibility of establishing direct connections between endpoints. In particular, the DFC utility determines whether the Ethernet switch supports FCoE ACL checking. Further, the DFC utility creates a zone ID for the FCoE endpoint device. The DFC utility allows direct communication between FCoE endpoints within the same fibre zone.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element may be provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
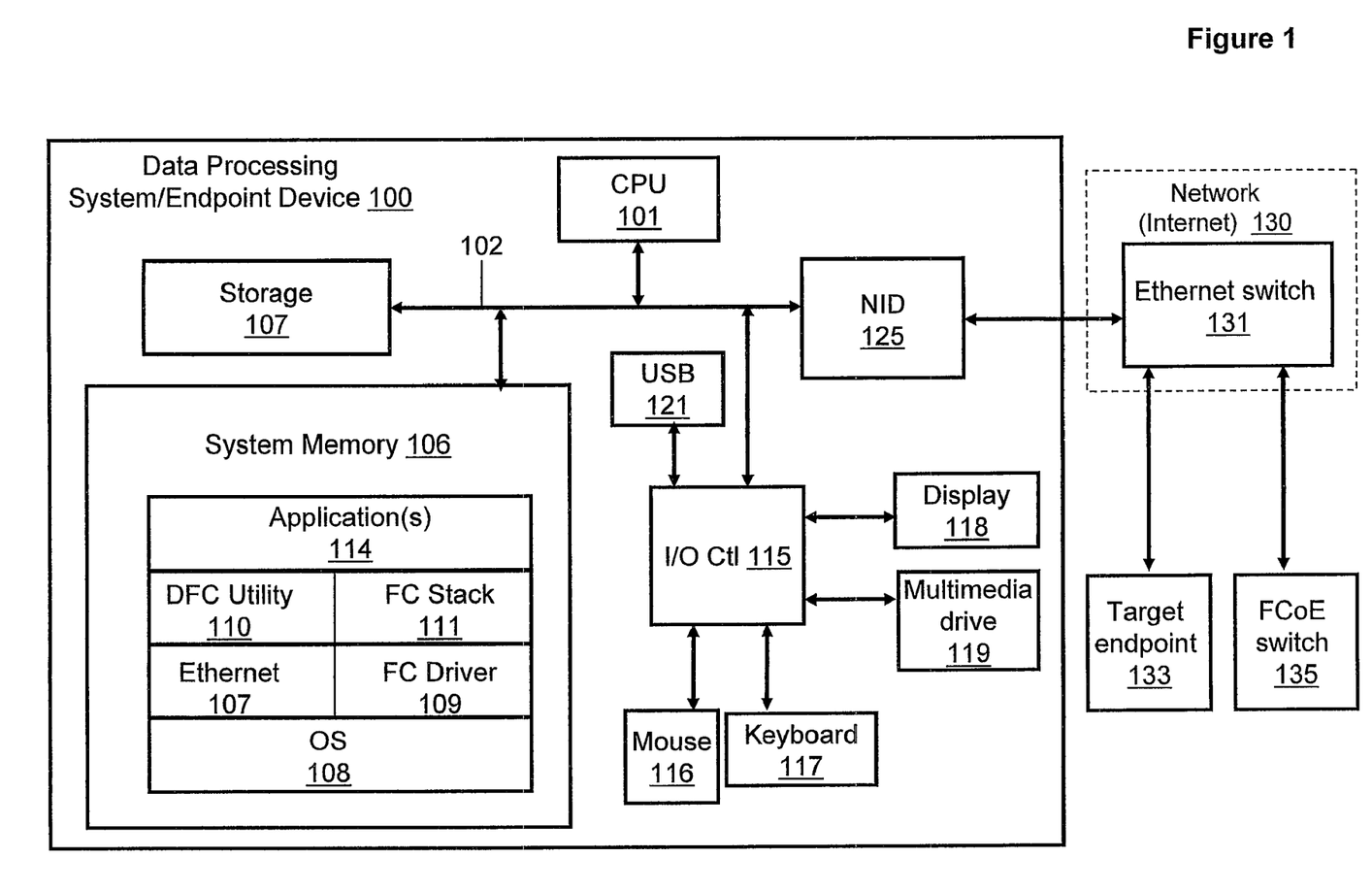
FIG. 1 is a block diagram representation of a data processing system operating as an endpoint device, according to one embodiment.

With reference now to FIG. 1, there is depicted a block diagram representation of a data processing system (DPS) used as an originating endpoint device (EDP) (and connected network), which may represent a fibre channel over Ethernet (FCoE) endpoint device. DPS/EDP 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored.

DPS 100 is also illustrated with a network interface device (NID)/Adapter 125. Adapter 125 may be equipped with logic to enable FCoE communication. Further, Adapter 125 enables DPS 100 to connect to one or more destination endpoint devices 133 via access network 130, such as the Internet. Access network 130 may also contain Ethernet switch 131. Ethernet switch 131 is directly connected to endpoint device(s) 133 and also to FCoE switch 135, facilitating FCoE. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®, a registered trademark of IBM), applications 114, Ethernet (software) 107, fibre channel (FC) stack 111, FC driver 109, and direct fibre communication (DFC) utility 110. For simplicity, DFC utility 110 is illustrated and described as a stand alone or separate software/firmware component, which provides specific functions, as described below.

CPU 101 executes DFC utility 110 as well as OS 108, which supports the user interface features of DFC utility 110. In the illustrative embodiment, DFC utility 110 generates/provides several graphical user interfaces (GUI) to enable user interaction with, or manipulation of, the functional features of the utility (110). Among the software code/instructions provided by DFC utility 110, and which are specific to the invention, are: (a) code for providing an exclusive ability to an FCoE stack to define an Ethertype of "FCoE" within an ethertype field of an Ethernet packet; (b) code for enabling storage of one or more access control lists (ACLs) containing allowed destination addresses and allowed source addresses; and (c) code for enabling direct communication between FCoE endpoints when said FCoE endpoints have a same Zone ID. For simplicity of the description, the collective body of code that enables these various features is referred to herein as DFC utility 110. According to the illustrative embodiment, when CPU 101 executes DFC utility 110, DPS 100 initiates a series of functional processes that enable the above functional features as well as additional features/functionality, which are described below within the description of FIGS. 2-6.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The endpoint device depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
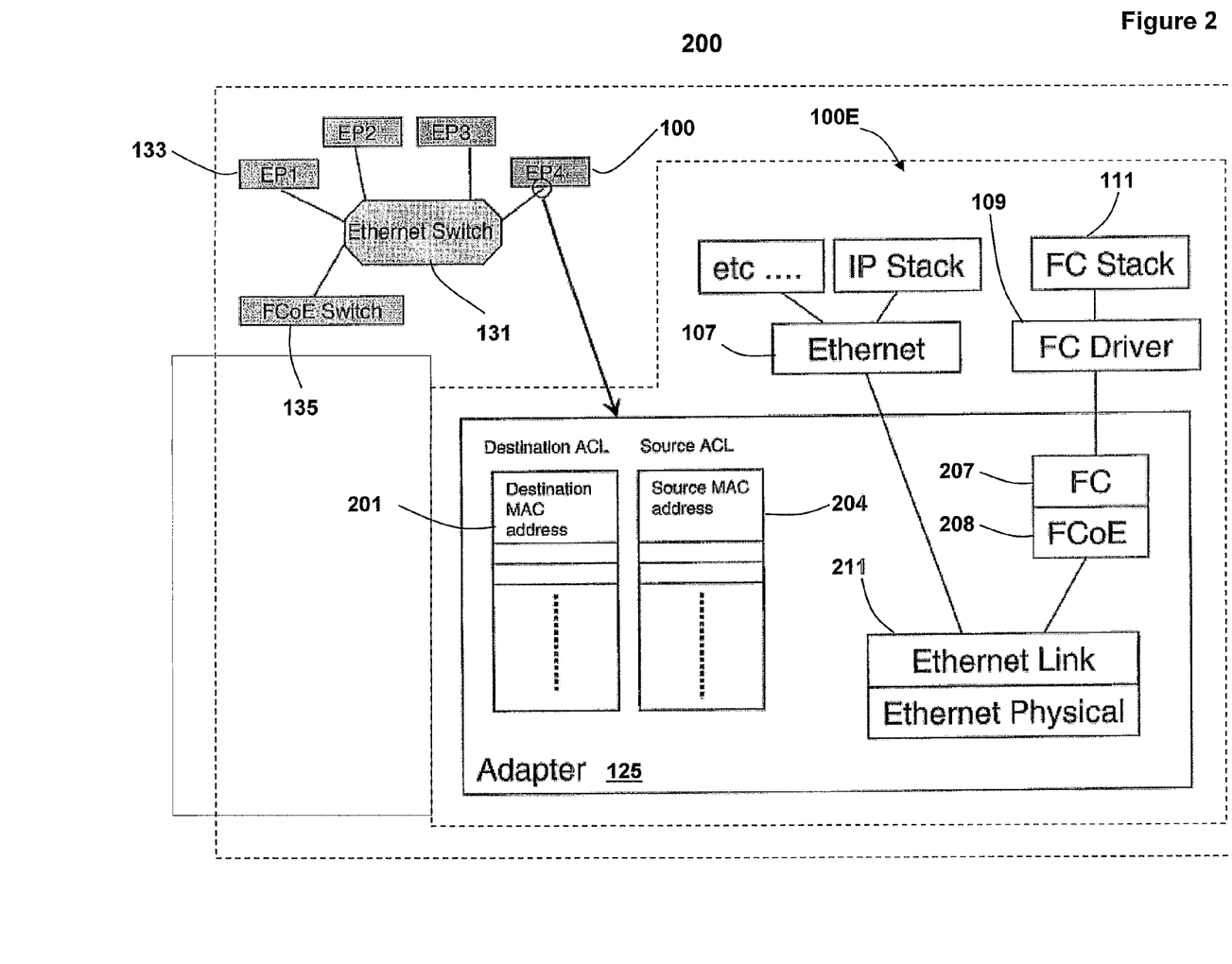
FIG. 2 illustrate fibre channel endpoints, an Ethernet switch and a FCoE switch within a communication network, according to one embodiment.

With reference now to FIG. 2, fibre channel endpoints, an Ethernet switch and a FCoE switch within a communication network are illustrated, according to one embodiment. Network 200 comprises several endpoints including endpoint-1 133 and endpoint-4 100 connected to Ethernet switch 131. Also connected to Ethernet switch 131 is FCoE switch 135. Included within endpoint-4 100 (via/within expanded view 100E) is adapter 125. Adapter 125 has various components including destination ACL 201 and Source ACL 204. Also included within adapter 125 is Ethernet logic/hardware 211, the functions of which are guided by Ethernet software 107. Also included within adapter 125 is fibre channel (FC) 207 which is connected to specific logic 208 for enabling fibre channels over ethernet (FCoE). The software counterparts are FC stack 111 and FC driver 109. The software components are located within memory 106 of endpoint-4 100.

In network 200, FCoE switch 135 provides adapter 125 with two sets of the access control lists. ACL 201 contains a list of the allowed destination addresses. ACL 204 contains a list of the allowed source addresses. In one embodiment, FCoE switch 135 may write a single ACL that is used for checking both destination incoming and source outbound call types.

DFC utility 110 executing within endpoint-4 100 initiates an exchange of messages with Ethernet switch 131 to determine the feasibility of establishing direct connections with other endpoints. The message exchange begins when DFC utility 110 issues a first get request to create a new managed information database (MIB) object (for a device establishment on the Ethernet switch) or an extension to an MIB II interface object (to communicate with a destination endpoint).

MIB is a Simple Network Management Protocol (SNMP) structure for device management that contains an abstraction of configuration and device information. SNMP is a Transmission Control Protocol (TCP)/Internet Protocol (IP) protocol designed for management of networks over TCP/IP.

Further, a first get request to initiate communication with destination endpoint device 133 initiates a check to determine whether Ethernet switch 131 supports FCoE ACL checking. DFC utility 110 then issues a first get response to receive a "YES" response that indicates that Ethernet switch 131 supports FCoE ACL checking or a "NO" response that indicates that Ethernet switch 131 does not support FCoE ACL checking. In response to obtaining a YES response to the first get response, DFC utility 110 issues a set request in order to set fibre channel zoning to initiate creation of a zone ID for an endpoint which issues the set request.

DFC utility 110 sends a second get request to initiate a check to determine whether the creation of the zone ID is completed. DFC utility 110 then transmits a second get response to receive a "YES" response that indicates that the creation of the zone ID is completed or a "NO" response that indicates that the creation of the zone ID is not completed. In response to obtaining a YES response to the second get response, DFC utility 110 issues a third get request in order to initiate a read of a zoning table and compares a result of the read of the zoning table with a value of the zone ID of the fibre channel zoning. When the result of the read of the zoning table is equal to the value of the original zoning setting, DFC utility 110 enables a direct connection between endpoints (source and destination endpoints) having a same zone ID.

Figure 3:
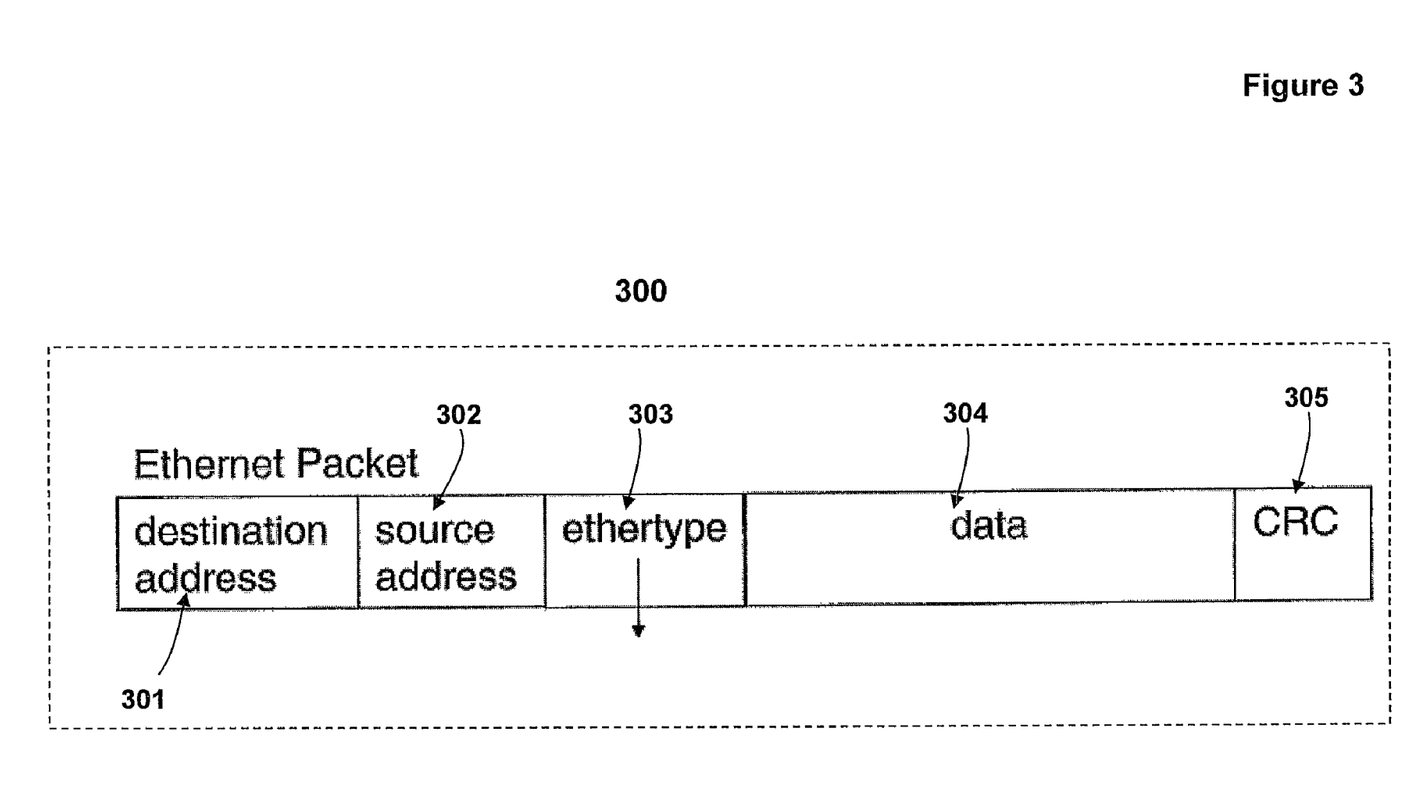
FIG. 3 illustrates an Ethernet packet, according to one embodiment.

FIG. 3 illustrates an Ethernet packet, according to one embodiment. Ethernet packet 300 contains the following information: destination address field 301 specifies the device or devices to which the packet is sent; source address field 302 contains the unique address of the device that is transmitting the packet; type field 303 identifies the higher-level protocol associated with the packet. The value of type field 303 is interpreted at the data link level; data field 304 contains the information received from the Network Layer; Cyclic Redundancy Check (CRC) field 305 is an error checking field. The CRC is generated based on the destination address, type and data fields.

In the embodiment, DFC utility 110 ensures that an ability of a stack to define an Ethertype of "FCoE" within an ethertype field of an Ethernet packet is "exclusively" provided by an FCoE stack. In other words, (in the embodiment) only an FCoE stack (from among a group of stacks sharing the same adapter (125)) is allowed to place "FCoE" within the ethertype field of an Ethernet packet. Ethernet software 107 and Ethernet hardware 211 collectively ensure that no other stack utilizing adapter 125 is able to place "FCoE" into type field 303 of Ethernet packet 300.

Figure 4:
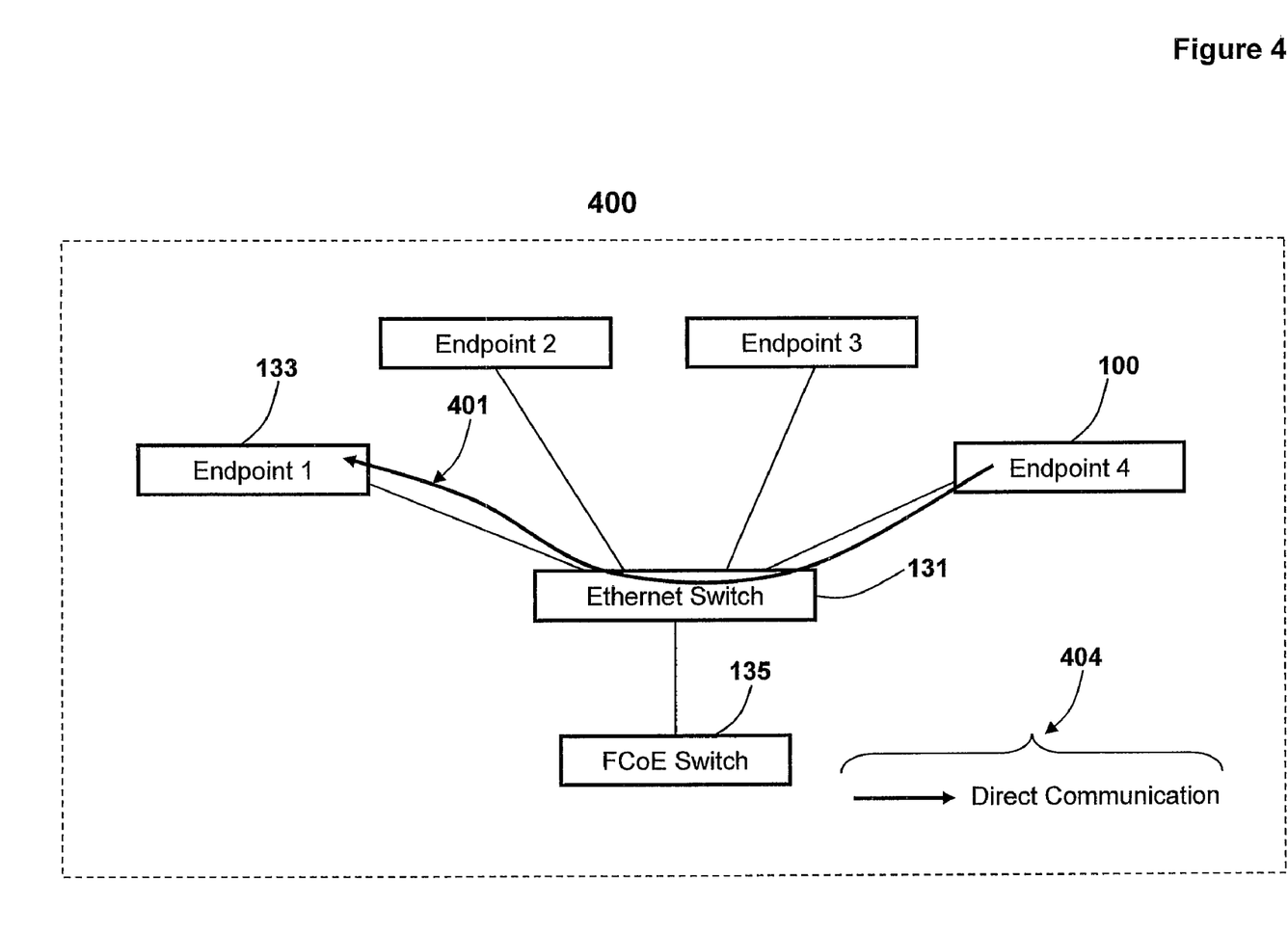
FIG. 4 illustrates direct communication between fibre channel endpoints within a communication network, according to one embodiment.

FIG. 4 illustrates direct communication between fibre channel endpoints within a communication network, according to one embodiment. Network 400 comprises several endpoints including endpoint-1 133 and endpoint-4 100 connected to Ethernet switch 131. Also connected to Ethernet switch 131 is FCoE switch 135. With the aid of direct communication indicator/legend 404, direct communication 401 is illustrated between endpoint-1 133 through endpoint-4 100.

DFC utility 110 creates a zone ID for each FCoE endpoint device. DFC utility 110 utilizes ACL 201 and ACL 204 to enable direct communication within a zone/group such that only members of the group may communicate with each other. Specifically, DFC utility 110 allows direct communication between FCoE endpoints within the same fibre zone.

Figure 5:
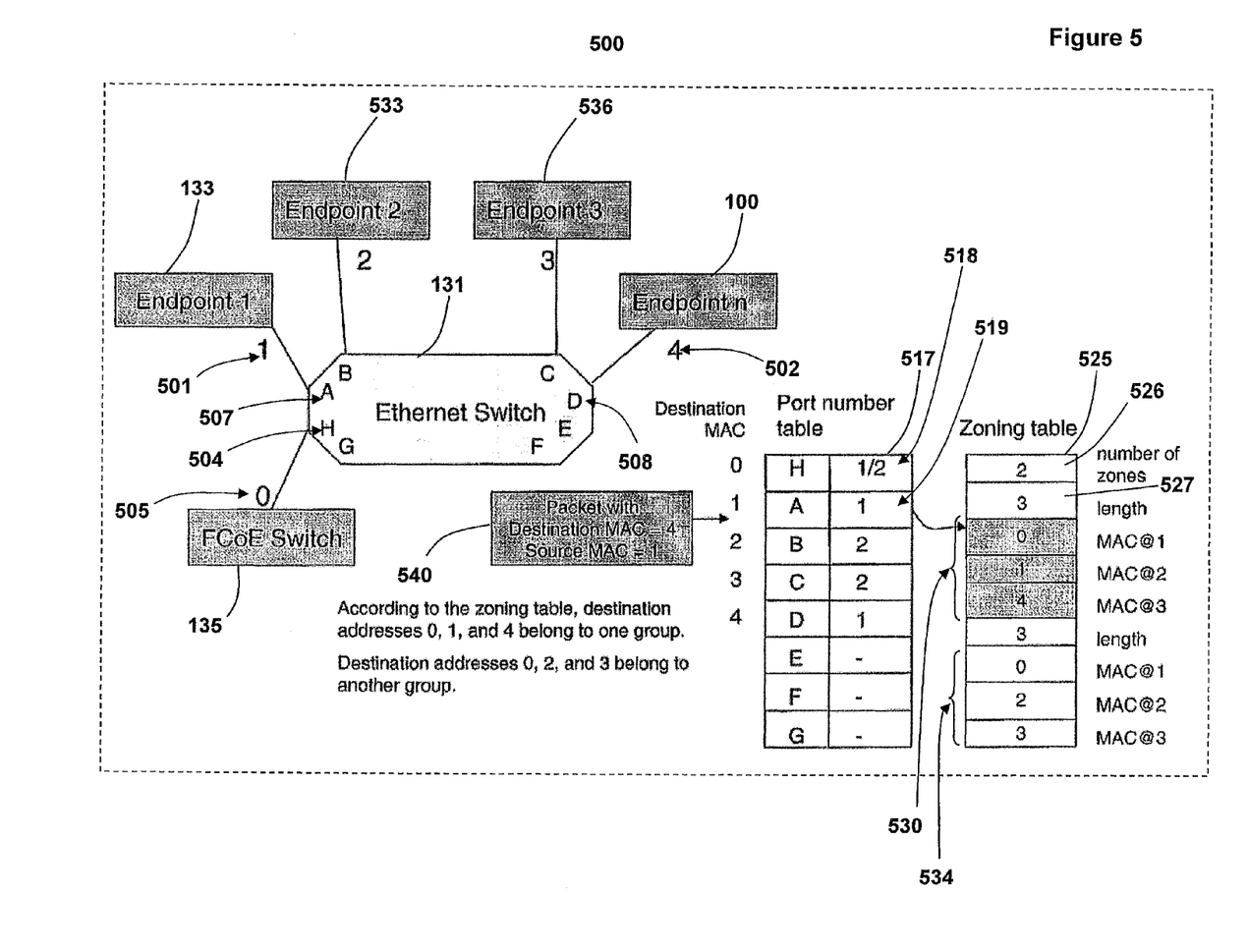
FIG. 5 illustrates an example zone assigning procedure with the aid of a zoning table, a port number table, fibre channel endpoints with associated MAC addresses, a FCoE switch with associated MAC address and an Ethernet switch with associated port numbers within a communication network, according to one embodiment.

FIG. 5 illustrates an example zone assigning procedure with the aid of a zoning table, a port number table, fibre channel endpoints with associated MAC addresses, a FCoE switch with associated MAC address and an Ethernet switch with associated port numbers within a communication network, according to one embodiment. Nework components 500 comprises several endpoints including endpoint-1 133 and endpoint-n 100 connected to Ethernet switch 131. Ethernet switch 131 comprises several ports (A-H) at which different devices connect. In particular, Endpoint-1 133 is located by (i.e., connected to) a port with an associated MAC address designated by) first MAC address 501 which is (addressed by) "1". Further, endpoint-1 133 is connected to Ethernet switch 131 via first port-A 507. Endpoint-n 100 is located by second MAC address 502 which is (addressed/addressable by) "4". Further, endpoint-n 100 is connected to Ethernet switch 131 via second port-D 508. Also connected to Ethernet switch 131 is FCoE switch 135. FCoE switch 135 is located by third MAC address 505 which is (addressed by) "0" and is connected to Ethernet switch 131 via third port-H 504.

Network components 500 also comprises port number table 517 and zoning table 525. Port number table 517 indicates that FCoE switch 135 having MAC address "0" is located within both zone 1 and zone 2 as illustrated by first zone identifier 518. Port number table 517 also indicates that Endpoint-1 133 having MAC address "1" is located within zone 1 as illustrated by second zone identifier 519. Zoning table 525 comprises an entry (illustrated by number of zones entry 526) indicating the number of zones associated with Ethernet switch 131. First length entry 527 indicates the number of components within the first zone (i.e., zone 1). First length entry 527 indicates that there are three (3) components in zone 1. The next three entries identify, by MAC address, the specific components that are located within zone 1. Thus, FCoE switch 135 located by MAC address "0", endpoint-1 133 (address "1") and endpoint-n 100 (address "4") are located in zone 1 as illustrated by zone-1 530. Similarly, according to zoning table 525, destination addresses 0, 2, and 3 belong to another group (zone 2) as illustrated by zone-2 534. These destination addresses correspond to FCoE switch 135, endpoint-2 533 and endpoint-3 536, respectively.

In the embodiment, communication is allowed only within the group/zone such that members of a group may communicate only with other group members. For example, packet 540 originating from a source MAC of "0" and destined for MAC of "4" is an allowed packet, while a similar packet originating from a source MAC of "0" and destined for MAC of "3" is rejected.

Figure 6:
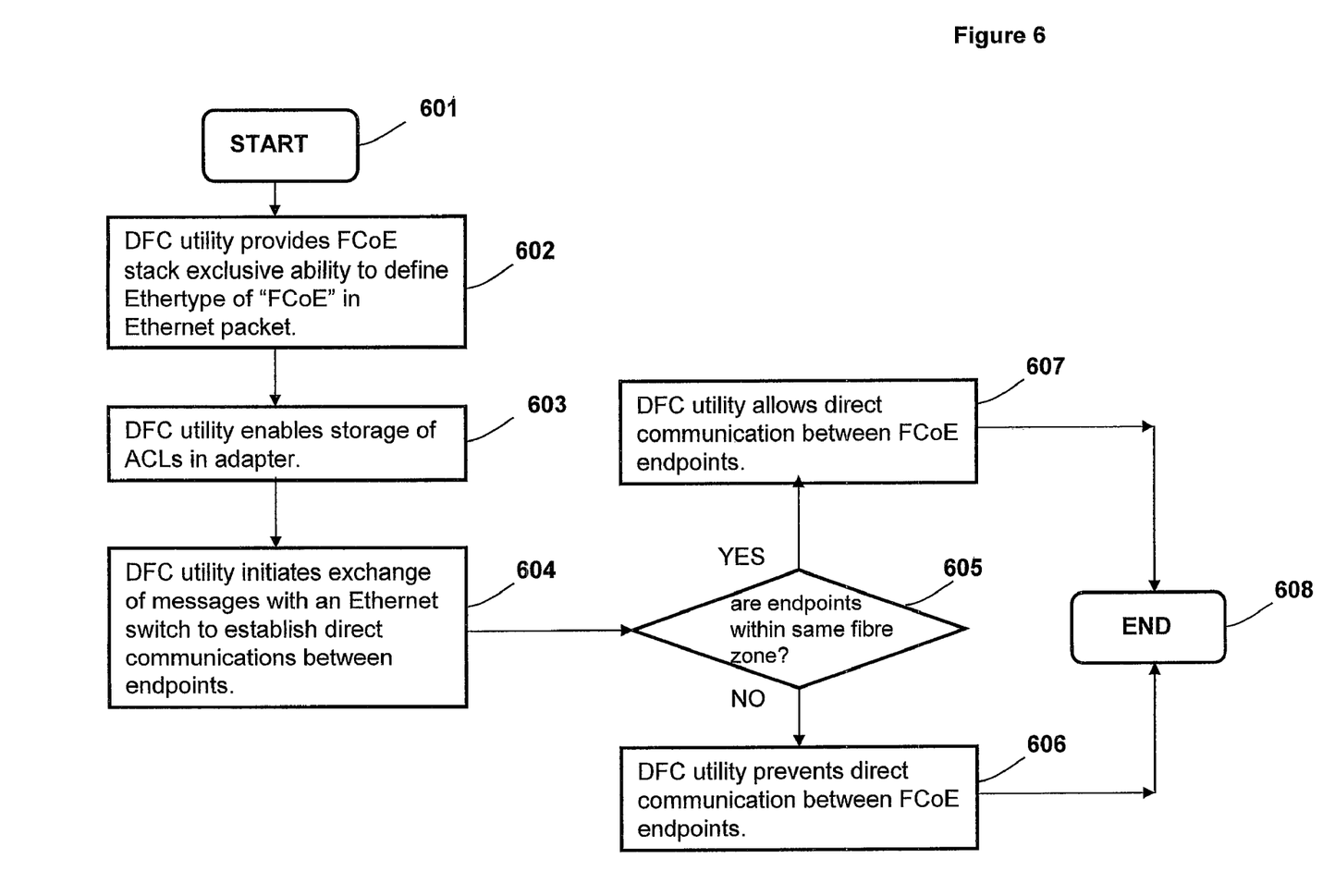
FIG. 6 is a flow chart illustrating the process of establishing direct communication between FCoE endpoints, according to one embodiment.

FIG. 6 is a flow chart illustrating the process of establishing direct communication between FCoE endpoints, according to one embodiment. Although the methods illustrated in FIG. 6 may be described with reference to components shown in FIGS. 1-5, it should be understood that this is merely for convenience and alternative components and/or configurations thereof can be employed when implementing the various methods. Key portions of the methods may be completed by DFC utility 110 executing within DPS/EDP 100 (FIG. 1) and controlling specific operations of/on DPS/EDP 100, and the methods are thus described from the perspective of either/both DFC utility 110 and DPS/EDP 100.

The process of FIG. 6 begins at initiator block 601 and proceeds to block 602, at which DFC utility 110 provides to an FCoE stack an exclusive ability to define an Ethertype of "FCoE" in the ethertype field of an Ethernet packet. At block 603, DFC utility 110 enables storage of access control lists (ACLs) containing allowed destination and source addresses within adapter 125 of endpoint device 100. DFC utility 110 initiates an exchange of messages (as described in FIG. 2) with an Ethernet switch in order to establish direct connections between endpoints, as shown at block 604. At decision block 605, DFC utility 110 determines whether endpoints are located within a same fibre zone. If at block 605, DFC utility 110 determines that the endpoints are not in the same zone, the process proceeds to block 606, at which, DFC utility 110 prevents (direct and indirect) communication between FCoE endpoints. If at block 605, DFC utility 110 determines that the endpoints are in the same zone, the process proceeds to block 607, at which, DFC utility 110 allows direct communication between FCoE endpoints. The process ends at block 608.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing device, a method comprising:
providing an exclusive ability to a fibre channel over Ethernet (FCoE) stack to define an Ethertype within an ethertype field of an Ethernet packet with a value "FCoE";
enabling, at an adapter, storage of one or more access control lists (ACLs) containing allowed destination addresses and allowed source addresses;
exchanging one or more messages with an Ethernet switch to determine a feasibility of establishing direct communication with other endpoints, wherein determining the feasibility comprises:
retrieving a definition value for the ethertype field of Ethernet packets of non-FCoE stacks, wherein said Ethernet packets are transmitted by a same adapter used for packet transmission by an FCoE stack;
obtaining a field value for the ethertype field of Ethernet packets of an FCoE stack;
comparing the definition value for the ethertype field of Ethernet packets of the non-FCoE stacks with the value "FCoE";
in response to the definition value for the ethertype field of an Ethernet packet being equal to the value "FCoE" for a non-FCoE stack, preventing a process to connect FCoE endpoints; and
in response to the definition value for the ethertype field of Ethernet packets not being equal to the value "FCoE" for the non-FCoE stacks and the field value associated with the FCoE stack is "FCoE", enabling an initiation of a process to connect FCoE endpoints, including an exchange of messages between an endpoint and an Ethernet switch; and
allowing direct communication between FCoE endpoints when said FCoE endpoints have a same Zone ID.

2. The method of claim 1 further comprising:
updating the ACLs when an endpoint connection to the Ethernet switch is added or removed.

3. A data processing system comprising:
a processor;
a memory system coupled to the processor;
a device for enabling a network connection to an Ethernet switch;
a utility which when executed on the processor causes the data processing system to:
provide an exclusive ability to a fibre channel over Ethernet (FCoE) stack to define an Ethertype within an ethertype field of an Ethernet packet with a value "FCoE";
enable, at an adapter, storage of one or more access control lists (ACLs) containing allowed destination addresses and allowed source addresses;
exchange one or more messages with an Ethernet switch to determine a feasibility of establishing direct communication with other endpoints; and
enable and allow direct communication between FCoE endpoints when said FCoE endpoints have a same Zone ID;
wherein instructions of the utility that causes the data processing system to provide the exclusive ability further comprises instructions that causes the data processing system to:
retrieve a definition value for the ethertype field of Ethernet packets of non-FCoE stacks, wherein said Ethernet packets are transmitted by a same adapter used for packet transmission by an FCoE stack;
obtain a field value for the ethertype field of Ethernet packets of an FCoE stack;
compare the definition value for the ethertype field of Ethernet packets of the non-FCoE stacks with the value "FCoE";
in response to the definition value for the ethertype field of an Ethernet packet being equal to the value "FCoE" for a non-FCoE stack, prevent a process to connect FCoE endpoints; and
in response to the definition value for the ethertype field of Ethernet packets not being equal to the value "FCoE" for the non-FCoE stacks and the field value associated with the FCoE stack is "FCoE", enable an initiation of a process to connect FCoE endpoints, including an exchange of messages between an endpoint and an Ethernet switch.

4. The data processing system of claim 3, wherein said utility further comprises instructions that causes the data processing system to:

update the ACLs when an endpoint connection to the Ethernet switch is added or removed.

5. A computer program product comprising:
   a non-transitory computer readable medium; and
   program code on said non-transitory computer readable medium that when executed within a data communication device, said program code provides the functionality of:
   providing an exclusive ability to a fibre channel over Ethernet (FCoE) stack to define an Ethertype within an ethertype field of an Ethernet packet with a value "FCoE";
   enabling, at an adapter, storage one or more access control lists (ACLs) containing allowed destination addresses and allowed source addresses;
   exchanging one or more messages with an Ethernet switch to determine a feasibility of establishing direct communication with other endpoints, wherein said code for exchanging further comprises code for:
      issuing a first get request to create a new managed information database (MIB) object or an extension to an MIB II interface object, wherein said get request initiates a check to determine whether an Ethernet switch supports FCoE ACL checking;
      issuing a first "get response" to receive one of a "YES" response that indicates that the Ethernet switch supports FCoE ACL checking and a "NO" response that indicates that the Ethernet switch does not support FCoE ACL checking; and
      in response to obtaining a YES response to the first get response, issuing a "set request" in order to set fibre channel zoning, wherein said fibre channel zoning represents a creation of a zone ID for an endpoint which issues the set request; and
   enabling and allowing direct communication between FCoE endpoints when said FCoE endpoints have a same Zone ID.

6. The computer program product of claim 5, said program code further comprising code for:
   sending a second get request to initiate a check to determine whether the creation of the zone ID is completed;
   transmitting a second "get response" to receive one of a "YES" response that indicates that the creation of the zone ID is completed and a "NO" response that indicates that the creation of the zone ID is not completed, following the second get request; and
   in response to obtaining a NO response to the second get response, waiting for a preset length of time prior to a re-issue of a message to determine whether the creation of the zone ID is completed.

7. The computer program product of claim 6, said program code further comprising code for:
   in response to obtaining a YES response to the second get response, issuing a third get request in order to initiate a read of a zoning table to obtain zone information for one or more of an originating device or a target device;
   comparing a result of the read of the zoning table with a value of the zone ID of the fibre channel zoning; and
   in response to the result of the read of the zoning table being equal to the value of the original zoning setting, enabling a direct communication between endpoints having a same zone ID.

8. The computer program product of claim 5, wherein said code for determining further comprises code for:
   retrieving a definition value for the ethertype field of Ethernet packets of non-FCoE stacks, wherein said Ethernet packets are transmitted by a same adapter used for packet transmission by an FCoE stack;
   obtaining a field value for the ethertype field of Ethernet packets of an FCoE stack;
   comparing the definition value for the ethertype field of Ethernet packets of the non-FCoE stacks with the value "FCoE";
   in response to the definition value for the ethertype field of an Ethernet packet not being equal to the value "FCoE" for a non-FCoE stack, preventing a process to connect FCoE endpoints; and
   in response to the definition value for the ethertype field of Ethernet packets not being equal to the value "FCoE" for the non-FCoE stacks and the field value associated with the FCoE stack is "FCoE", enabling an initiation of a process to connect FCoE endpoints, including an exchange of messages between an endpoint and an Ethernet switch.

9. The computer program product of claim 7, said program code further comprising code for:
   updating the ACLs when an endpoint connection to the Ethernet switch is added or removed.

10. A method implemented in a data processing device, the method comprising:
    providing an exclusive ability to a fibre channel over Ethernet (FCoE) stack to define an Ethertype within an ethertype field of an Ethernet packet with a value "FCoE";
    enabling, at an adapter, storage of one or more access control lists (ACLs) containing allowed destination addresses and allowed source addresses;
    exchanging one or more messages with an Ethernet switch to determine a feasibility of establishing direct communication with other endpoints, wherein said exchanging further comprises:
       issuing a first get request to create a new managed information database (MIB) object or an extension to an MIB II interface object, wherein said get request initiates a check to determine whether an Ethernet switch supports FCoE ACL checking;
       issuing a first "get response" to receive one of a "YES" response that indicates that the Ethernet switch supports FCoE ACL checking and a "NO" response that indicates that the Ethernet switch does not support FCoE ACL checking; and
       in response to obtaining a YES response to the first get response, issuing a "set request" in order to set fibre channel zoning, wherein said fibre channel zoning represents creation of a zone ID for an endpoint which issues the set request; and
    allowing direct communication between FCoE endpoints when said FCoE endpoints have a same Zone ID.

11. The method of claim 10, further comprising:
    sending a second get request to initiate a check to determine whether the creation of the zone ID is completed;
    transmitting a second "get response" to receive one of a "YES" response that indicates that the creation of the zone ID is completed and a "NO" response that indicates that the creation of the zone ID is not completed, following the second get request; and
    in response to obtaining a NO response to the second get response, waiting for a preset length of time prior to a re-issue of a message to determine whether the creation of the zone ID is completed.

12. The method of claim 11, further comprising:
    in response to obtaining a YES response to the second get response, issuing a third get request in order to initiate a read of a zoning table to obtain zone information for one or more of an originating device or a target device;

comparing a result of the read of the zoning table with a value of the zone ID of the fibre channel zoning; and in response to the result of the read of the zoning table being equal to the value of the original zoning setting, enabling a direct communication between endpoints having a same zone ID.

13. A data processing system comprising:

a processor;

a memory system coupled to the processor;

a device for enabling a network connection to an Ethernet switch;

a utility which when executed on the processor causes the data processing system to:

provide an exclusive ability to a fibre channel over Ethernet (FCoE) stack to define an Ethertype within an ethertype field of an Ethernet packet with a value "FCoE";

enable, at an adapter, storage of one or more access control lists (ACLs) containing allowed destination addresses and allowed source addresses;

exchange one or more messages with an Ethernet switch to determine a feasibility of establishing direct communication with other endpoints, wherein said utility further comprises instructions that cause the data processing system to:

issue a first get request to create a new managed information database (MIB) object or an extension to an MIB II interface object, wherein said get request initiates a check to determine whether an Ethernet switch supports FCoE ACL checking;

issue a first "get response" to receive one of a "YES" response that indicates that the Ethernet switch supports FCoE ACL checking and a "NO" response that indicates that the Ethernet switch does not support FCoE ACL checking; and in response to obtaining a YES response to the first get response, issue a "set request" in order to set fibre channel zoning, wherein said fibre channel zoning represents a creation of a zone ID for an endpoint which issues the set request; and enable and allow direct communication between FCoE endpoints when said FCoE endpoints have a same Zone ID.

14. The data processing system of claim 13, wherein said utility further causes the data processing system to:

send a second get request to initiate a check to determine whether the creation of the zone ID is completed;

transmit a second "get response" to receive one of a "YES" response that indicates that the creation of the zone ID is completed and a "NO" response that indicates that the creation of the zone ID is not completed, following the second get request; and in response to obtaining a NO response to the second get response, wait for a preset length of time prior to a re-issue of a message to determine whether the creation of the zone ID is completed.

15. The data processing system of claim 14, wherein said utility further causes the data processing system to:

in response to obtaining a YES response to the second get response, issue a third get request in order to initiate a read of a zoning table to obtain zone information for one or more of an originating device or a target device;

compare a result of the read of the zoning table with a value of the zone ID of the fibre channel zoning; and in response to the result of the read of the zoning table being equal to the value of the original zoning setting, enable a direct communication between endpoints having a same zone ID.

16. In a data processing device, a system comprising:

means for providing an exclusive ability to a fibre channel over Ethernet (FCoE) stack to define an Ethertype within an ethertype field of an Ethernet packet with a value "FCoE";

means for enabling, at an adapter, storage of one or more access control lists (ACLs) containing allowed destination addresses and allowed source addresses;

means for exchanging one or more messages with an Ethernet switch to determine a feasibility of establishing direct communication with other endpoints, wherein said means for determining the feasibility comprises:

means for retrieving a definition value for the ethertype field of Ethernet packets of non-FCoE stacks, wherein said Ethernet packets are transmitted by a same adapter used for packet transmission by an FCoE stack;

means for obtaining a field value for the ethertype field of Ethernet packets of an FCoE stack;

means for comparing the definition value for the ethertype field of Ethernet packets of the non-FCoE stacks with the value "FCoE";

means for, in response to the definition value for the ethertype field of an Ethernet packet being equal to the value "FCoE" for a non-FCoE stack, preventing a process to connect FCoE endpoints; and means for, in response to the definition value for the ethertype field of Ethernet packets not being equal to the value "FCoE" for the non-FCoE stacks and the field value associated with the FCoE stack is "FCoE", enabling an initiation of a process to connect FCoE endpoints, including an exchange of messages between an endpoint and an Ethernet switch; and means for allowing direct communication between FCoE endpoints when said FCoE endpoints have a same Zone ID.

* * * * *